(12) United States Patent
Preisenberger et al.

(10) Patent No.: US 12,422,054 B2
(45) Date of Patent: Sep. 23, 2025

(54) VACUUM UNIT

(71) Applicant: Festo SE & Co. KG, Esslingen (DE)

(72) Inventors: Georg Preisenberger, Esslingen (DE); Marco Kunze, Remshalden (DE)

(73) Assignee: Festo SE & Co. KG, Esslingen (DE)

( * ) Notice: Subject to any disclaimer, the term of this patent is extended or adjusted under 35 U.S.C. 154(b) by 375 days.

(21) Appl. No.: 18/310,133

(22) Filed: May 1, 2023

(65) Prior Publication Data

US 2023/0349480 A1 Nov. 2, 2023

(30) Foreign Application Priority Data

May 2, 2022 (DE) ...................... 10 2022 110 635.7

(51) Int. Cl.
*F16K 27/00* (2006.01)
*B25J 15/06* (2006.01)
*F04F 5/20* (2006.01)

(52) U.S. Cl.
CPC .............. *F16K 27/003* (2013.01); *F04F 5/20* (2013.01); *B25J 15/0625* (2013.01)

(58) Field of Classification Search
CPC ........ F16K 27/003; F04F 5/20; B25J 15/0625
See application file for complete search history.

(56) References Cited

U.S. PATENT DOCUMENTS

| | | | |
|---|---|---|---|
| 4,089,622 A * | 5/1978 | Aubel | F04F 5/44 417/189 |
| 5,683,227 A | 11/1997 | Nagai et al. | |
| 6,416,295 B1 | 7/2002 | Nagai et al. | |
| 2003/0180154 A1 | 9/2003 | Yamazaki et al. | |
| 2003/0183447 A1 * | 10/2003 | Zindl | F04F 5/44 181/217 |
| 2006/0278282 A1 | 12/2006 | Nagai et al. | |
| 2019/0226474 A1 * | 7/2019 | Krohn | F16K 5/0647 |
| 2019/0382215 A1 | 12/2019 | Nakayama et al. | |

(Continued)

FOREIGN PATENT DOCUMENTS

| | | |
|---|---|---|
| DE | 44 91 977 C1 | 10/1994 |
| DE | 100 42 488 A1 | 5/2001 |

(Continued)

OTHER PUBLICATIONS

Examination Report issued in corresponding German Patent Application No. 10 2022 110 635.7, Jan. 18, 2023, 6 pages.

*Primary Examiner* — Mark A Connolly
(74) *Attorney, Agent, or Firm* — HSML P.C.

(57) ABSTRACT

A vacuum unit having at least one vacuum generator extending along a main axis and comprising a base body, further having a silencer housing containing a silencer. An ejector unit extends in the base body and an ejector axis is oriented parallel to the main axis and a suction zone of the ejector unit communicates via a vacuum channel with a vacuum tapping opening, and an air exhaust channel of the ejector unit extends through the silencer housing and has a deflected course through 90 degrees in the silencer housing and opens out to the environment with an air exhaust opening. The vacuum tapping opening is formed on an end face of the silencer housing facing away from the base body in the main direction and wherein the air exhaust opening is also formed on the silencer housing with an orientation perpendicular to the main axis.

22 Claims, 3 Drawing Sheets

(56) References Cited

U.S. PATENT DOCUMENTS

2021/0038855 A1* 2/2021 Oddo .................. F04F 5/16
2023/0347478 A1* 11/2023 Preisenberger .... G05D 16/2013

FOREIGN PATENT DOCUMENTS

| DE | 603 00 225 T2 | 12/2005 |
| DE | 10 2006 027 250 A1 | 12/2006 |
| DE | 10 2015 206 717 B3 | 8/2016 |
| WO | 2005/066493 A1 | 7/2005 |

* cited by examiner

VACUUM UNIT

This application claims priority to German application 10 2022 110 635.7, filed May 2, 2022, which is incorporated by reference.

FIELD OF THE INVENTION

The invention relates to a vacuum unit with at least one vacuum generator which extends in a main direction along an imaginary main axis and which has a base body through which an air injection channel passes and with a silencer housing which is attached to the base body in a joining region in the main direction and which contains a silencer, wherein an ejector unit extends in the base body with an ejector longitudinal axis which is oriented parallel to the main axis, which ejector unit has a jet nozzle fluidically connected to the air injection channel, a capture nozzle and a suction zone arranged between the jet nozzle and the capture nozzle, wherein the suction zone of the ejector unit communicates via a vacuum channel with a vacuum tapping opening arranged on an outer vacuum tapping surface of the vacuum generator and enabling the tapping of a vacuum, and wherein an air exhaust channel, which passes through the silencer housing and the silencer located therein and has a course deflected through 90 degrees in the silencer housing and opens out to the environment with an air exhaust opening on an air exhaust surface of the silencer housing, adjoins the capture nozzle.

BACKGROUND

A vacuum unit of this type known from DE 44 91 977 C1 and consists of a vacuum generator which has a base body and a silencer housing attached to the base body in a main axial direction. An ejector unit extends in the main axial direction in the base body, which is accommodated entirely in the base body and which has a jet nozzle connected to an air injection channel and a catch nozzle adjoining the jet nozzle and communicating on the exhaust side with an air exhaust channel. During operation of the vacuum generator, compressed air fed into the air injection channel flows through the ejector unit, generating a vacuum in a suction zone arranged between the suction nozzle and the capture nozzle, which vacuum can be tapped at a vacuum tapping opening formed on the outside of the vacuum generator at a vacuum tapping surface and communicating with the suction zone via a vacuum channel. The vacuum can be used, for example, to operate a suction gripper. The compressed air exiting the suction nozzle flows through an air exhaust channel passing through a silencer, so that the air exhaust noise of the compressed air exiting an air exhaust opening is minimized. An air exhaust surface of the silencer housing provided with the air exhaust opening has the same orientation as the vacuum pickup surface, wherein the air exhaust channel inside the silencer housing has a 90 degree angled course. The vacuum tapping surface with the vacuum tapping opening is formed on a cover body, which is attached to the base body independently of the silencer housing.

Another vacuum generator is known from DE 10 2006 027 250 A1, which has a one-piece base body on which an ejector unit is arranged on the outside. A jet nozzle of the ejector unit is connected to an air injection channel passing through the base body. An air exhaust channel adjoining a catch nozzle also passes through the base body, as does a vacuum channel which is connected on the one hand to an suction zone of the ejector unit and on the other hand communicates with at least one vacuum tapping opening formed on the base body. A silencer is arranged within the one-piece base body in the course of the air exhaust channel.

SUMMARY OF THE INVENTION

The invention is based on the task of creating a vacuum unit device which allows a favorable tapping of the generated vacuum with a simple and compact structure.

In order to solve this task, a vacuum unit comprising the features as mentioned above provides that the vacuum channel passes through the silencer housing, which is separate from the base body, in the main direction of the vacuum generator, wherein the vacuum tapping surface is oriented together with the vacuum tapping opening in the main direction and is formed on an end face of the silencer housing facing away from the base body in the main direction, and wherein the air exhaust surface is likewise formed on the silencer housing together with the air exhaust opening with an orientation perpendicular to the main axis.

The vacuum unit according to the invention contains one or more vacuum generators, each of which can be used to generate a vacuum that can be tapped at a vacuum tapping opening, each of the vacuum generators working according to the suction nozzle principle. The at least one vacuum generator contains an ejector unit which is at least partially accommodated in the base body and through which compressed air can flow to generate the vacuum. The vacuum generator extends in an axial direction, referred to as the main direction, of a main axis of the vacuum generator, i.e. in the same direction in which a silencer housing equipped with a silencer is attached to the base body as a separate component. The compressed air exiting from the ejector unit's capture nozzle during operation of the vacuum generator is deflected through 90 degrees in an air exhaust channel inside the silencer housing and exits with orientation perpendicular to the main axis at the correspondingly oriented air exhaust opening, which is located on an outer surface of the silencer housing designated as the air exhaust surface. A vacuum channel communicating with a suction zone of the ejector unit also passes through the silencer housing and opens out at a vacuum tapping opening of the silencer housing oriented in the main direction, this vacuum tapping opening being located on an outer surface of the silencer housing designated as a vacuum tapping surface, which is arranged on an end face of the silencer housing facing away axially from the base body. Thus, both the air exhaust opening and the vacuum tapping opening are formed in the silencer housing in a cost-effective and space-saving manner, and moreover in an orientation differing from one another by 90 degrees, so that the exhaust air jet exiting at the air exhaust opening cannot exert any negative influences on handling operations in the immediate vicinity of the vacuum tapping opening. So even if, for example, suction gripping operations take place in the immediate vicinity of the vacuum tapping opening, these cannot be disturbed by an air jet exiting through the silencer. The air exhaust oriented transverse to the main axis also allows a large silencer length with a correspondingly high silencing effect to be realized without increasing the overall length of the vacuum generator in the main direction. The channel deflection by 90 degrees of the air exhaust channel is expediently located in a length section of the air exhaust channel extending between the ejector unit and the silencer.

Advantageous further embodiments of the invention can be seen from the sub-claims.

The air exhaust channel expediently extends entirely within the silencer housing. Preferably, it has an air inlet channel section adjoining the capture nozzle and extending in the main direction of the vacuum generator, a deflection section adjoining the air inlet channel section, and an air exhaust channel section following the deflection section and leading to the air exhaust opening. The air exhaust channel section expediently runs continuously in a direction orthogonal to the main direction. The deflecting section defines the 90-degree deflected course of the channel, whereby it is in particular arc-shaped.

In a preferred embodiment, the air inlet channel section of the air exhaust channel and the vacuum channel are arranged in the silencer housing with a mutually parallel course and thereby one above the other in a height direction. The height direction is determined by the axial direction of an imaginary vertical axis which is oriented orthogonally to the main axis. When the vacuum generator is aligned with vertical vertical axis, the air inlet channel section of the air exhaust channel and the vacuum channel in the silencer housing extend vertically one above the other.

The air exhaust surface including the air exhaust opening is conveniently oriented in the height direction of the vacuum generator as explained above. With the vacuum generator oriented with vertical height direction, the compressed air is discharged upward or downward depending on whether the air discharge surface is located at the top or bottom of the silencer housing. The arrangement at the top with the result of compressed air being blown out upwards is preferred.

For the benefit of a good silencing effect, it is advantageous if there is a relatively large distance between the exhaust of the capture nozzle and the air exhaust surface of the silencer housing transverse to the main axis, which allows the integration of a relatively long silencer. To ensure that the dimensions of the silencer housing measured in the distance direction nevertheless remain compact, it is expedient for the ejector unit to open into the air exhaust channel close to an outer surface of the vacuum generator opposite the air exhaust surface. In this case, the vacuum channel extends expediently in an area located between the ejector unit and the air exhaust surface and, in particular, in the immediate vicinity of the ejector unit. Especially in such a constellation it is advantageous if the air exhaust channel and the vacuum channel cross each other inside the silencer housing without mutual communication in a crossing area. The 90-degree deflected section of the air exhaust channel, which was also referred to above as the deflection section, is expediently located in the crossing area.

The two channels are preferably crossed in such a way that the air exhaust channel in the crossing area is divided into two channel branches passing through the vacuum channel on opposite sides, which are connected to each other in a channel branch downstream and upstream of the passed air exhaust channel. The air suction flow caused during vacuum generation thus branches off in a region upstream of the air blow-off channel towards the vacuum tapping opening into two partial flows which pass through the air blow-off channel on opposite sides and then reunite before reaching the suction zone of the ejector unit.

As has been shown, the branching explained above is more favorable than a reverse arrangement in which the air blow-off channel branches off to pass the vacuum channel. Nevertheless, such an arrangement is certainly also possible.

A flat plate-like shape of the at least one vacuum generator is regarded as particularly favorable. This results from the fact that the dimensions of the vacuum generator in a transverse direction orthogonal to the main direction and following an imaginary transverse axis—hereinafter also referred to as the construction width—are smaller than the dimensions in the main direction, hereinafter also referred to as the construction length, and the dimensions in a height direction following a vertical axis orthogonal to the main axis and to the transverse axis, hereinafter also referred to as the construction height. Preferably, the overall height is also less than the overall length of the vacuum generator.

The ejector unit may be received in the main body along its entire length. However, a design is preferred in which the ejector unit is accommodated in the base body only over a part of its length associated with the jet nozzle and extends in the remainder of its length in the silencer housing. This opens up advantageous possibilities for accommodating further functional components in the basic body, which is to be kept as compact as possible. In particular, the ejector unit has a first longitudinal section comprising the jet nozzle and a second longitudinal section adjoining it and comprising at least a partial length and, in particular, only a partial length of the capture nozzle, the ejector unit passing through the joining region and being accommodated, on the one hand, with the first longitudinal section in the base body and, on the other hand, with the second longitudinal section in the silencer housing.

The ejector unit is conveniently inserted in a receiving space extending in the main direction, which is composed of a first receiving recess formed in the base body and opening out into the joining region, and a second receiving recess aligned therewith, formed in the silencer housing and likewise opening out into the joining region. The two recesses thus merge into one another in the joining region. The ejector unit is inserted with its first longitudinal section into the first receiving recess in a sealed manner with respect to the base body, while the second longitudinal section is inserted into the second receiving recess in a sealed manner with respect to the silencer housing. A sealing ring surrounding the ejector unit can be provided for the respective sealing.

It is useful if a movable check valve member is arranged in the course of the vacuum channel, which allows air flow in the direction of the suction zone and blocks an air flow in the opposite direction. This favors a longer maintenance of a generated vacuum in cases where the blowing of compressed air into the jet nozzle is interrupted to save energy. The separate design of the silencer housing with respect to the base body offers the advantageous possibility of arranging the check valve in the joining region between the base body and the silencer housing, which enables simple assembly and secure fixing of the check valve member. The check valve member is in particular a pivotable check valve partially clamped between the base body and the silencer housing, which in particular consists of a material with rubber-elastic properties.

Preferably, the at least one vacuum generator is equipped with means which, if required, allow the negative pressure generated in the vacuum channel to be quickly lifted. As a result, objects held by means of a suction gripper connected to the vacuum pick-up opening can be deposited or ejected again very quickly if required. In particular, such measures provide for the vacuum channel in the silencer housing to communicate with an air ventilation channel through which the vacuum channel can be pressurized. The ventilation channel has a first channel section running in the base body and a second channel section running in the silencer housing, one end of this second channel section merging into the first channel section in the joining region and opening into the vacuum channel at its other end. Consequently, the overpressurization of the vacuum channel can take place from the base body.

In operation, the active ventilation of the vacuum channel will be carried out in a regular pulse-like manner with a short overpressure pulse, which will also be referred to below as an ejection pulse because it helps to eject an object held by means of a suction gripper.

Preferably, an air regulator is inserted in the course of the second channel section of the ventilation channel in the silencer housing, which air regulator comprises a choke which is suitable for variable adjustment of a throttling intensity and which is arranged adjustably in the silencer housing. Such a choke is designed in particular as a throttle screw which can be accessed and adjusted from outside the vacuum generator. The choke can be used to adjust the intensity of the ejector pulse in order to take individual account of the properties of an object to be handled by a suction gripper.

It is advantageous if the air pressure prevailing in the vacuum channel can be monitored. To make this possible, it is useful if the vacuum channel in the silencer housing communicates with a sensor channel that also extends through the joining region in the base body of the vacuum generator and leads to a pressure sensor accommodated in the base body. The sensor channel can open directly into the vacuum channel in the silencer housing, although if an air ventilation channel is present, it is expedient for it to communicate with this air ventilation channel, in which the same pressure prevails as in the vacuum channel. The pressure sensor is used in particular for monitoring a desired negative pressure.

The pressure sensor is preferably mounted on a circuit board, hereinafter also referred to as a sensor board, which is fixed in the base body. The sensor board comprises evaluation electronics that evaluate the pressure values determined by the pressure sensor and trigger result-dependent measures, for example automated switching on and off of a compressed air supply to the air injection channel to implement an air-saving circuit. Diagnostic functions can also be implemented in the evaluation electronics. Preferably, the evaluation electronics are communicatively connected via the sensor board to an external electronic control unit or to an internal electronic control unit that is designed as a component of the vacuum unit and by means of which the function of the vacuum generator is basically controlled.

The silencer housing expediently contains a housing main body in which a receiving chamber is formed which receives the silencer and which is closed by a housing cover fixed to the housing main body, in which the air exhaust opening is formed. The housing cover is connected to the housing main body, for example, by a snap-on connection or a welded connection. Overall, the silencer housing is expediently made of a plastic material. For the silencer, a sleeve-shaped type of construction with a sleeve-shaped silencer body in which a silencer channel forming a length section of the air exhaust channel extends longitudinally is recommended. Preferably, the silencer is of an open type in which the silencer channel is open axially on both sides so that the discharged compressed air flows axially through the silencer. The silencer is preferably longer than its outer diameter and is arranged in the silencer housing, in particular with its longitudinal direction orthogonal to the main axis of the vacuum generator, so that a compact overall length can be achieved in the main direction of the vacuum generator.

With the exception of the air exhaust surface, no other outer surface of the silencer housing has an air exhaust opening. This favors a purposefully harmless blowing out of the exhaust air. As far as the air exhaust opening is concerned, this can consist of a single opening or of several partial openings separated from one another.

Each vacuum generator is expediently equipped with an electrically actuable vacuum control valve designed to control pressurization of the air injection channel. In particular, the vacuum control valve is capable of selectively causing a supply of compressed air to the air injection channel or of interrupting the supply of compressed air. Optionally, the possibility of venting the air injection channel through the vacuum control valve can be provided, especially in cases where no separate air ventilation channel is available. The vacuum control valve is expediently mounted on the base body, which has a suitable valve mounting surface for this purpose, at which the air injection channel opens out with its end opposite the jet nozzle for connection to the mounted vacuum control valve.

The vacuum control valve is expediently also connected to a preferably present air ventilation channel, whereby it is capable of controlling a pressurization of the air ventilation channel and thus also of the vacuum channel communicating with the air ventilation channel in order to release the vacuum when required. In particular, this control either feeds compressed air into the air ventilation channel or interrupts this feed and shuts off the air ventilation channel.

The controlled pressurization of the air injection channel and the air ventilation channel takes place in a coordinated manner. For this purpose, the vacuum control valve can be designed as a 3/3-way valve, for example, which has a shut-off position as a further switching position in which neither the air injection channel nor the air ventilation channel is pressurized with compressed air.

The vacuum control valve is in particular an electropneumatically pilot-controlled directional control valve.

A valve mounting surface of the base body that supports the vacuum control valve has the same orientation as the air exhaust surface of the silencer housing. In one possible position of use of the vacuum generator, the vacuum control valve can thus be arranged on an upper side of the vacuum generator in question, on which the air exhaust opening for the exhaust air of the ejector unit is also located.

In one possible embodiment, the vacuum unit consists of a single vacuum generator, so that one can speak of a vacuum unit in the form of a stand-alone vacuum generator. However, a preferred embodiment provides that the vacuum unit has a plurality of vacuum generators that are combined in a vacuum generator assembly and are attached to each other in such a way that uniform handling is possible. In this case, the several vacuum generators are lined up in a direction orthogonal to the main direction and mechanically connected to each other, for example by means of several tie rods passing through the base bodies. This is in particular a detachable connection. The base bodies of the vacuum generators arranged in a row are traversed by a common supply channel designed for connection to an external compressed air source, which is referred to as an assembly supply channel and which is connected in each vacuum generator to its vacuum control valve in order to provide the compressed air required for controlling the pressurization of the air injection channel and, optionally, of an air ventilation channel.

The vacuum unit can exclusively contain one or more vacuum generators as functional units. In order to cope with a wide range of control tasks, however, the vacuum unit and in particular the vacuum generator assembly can be equipped not only with vacuum generators as functional units, but can also have one or more valve units as further functional unit, which are not used for vacuum generation but enable pneumatic control of pneumatic drives, for example pneumatic drives actuated by compressed air.

Preferably, the optional valve units are lined up together with the vacuum generators in the direction of alignment and integrated into the vacuum generator assembly. The assembly supply channel also passes through each valve unit in order to supply compressed air to an electrically operable control valve device of the valve unit, which is designed to control the pressurization of at least one working channel formed in the valve unit, which is designed for fluidic connection to the pneumatic drive to be controlled.

Within the vacuum generator assembly, the vacuum generators and the valve units can each be arranged in their own function unit groups, which simplifies the necessary connection measures. In principle, however, the sequence of vacuum generators and valve units contained in the vacuum generator assembly is preferably freely configurable.

It is advantageous if the vacuum generators and valve units arranged in a row in the vacuum generator assembly are additionally penetrated by at least one common venting channel communicating with the atmosphere, which is referred to as an assembly vent channel and which is fluidically connected at least in each valve unit with its control valve device, in order to enable venting of pneumatic drives to be controlled through a common venting channel of the vacuum generator assembly. The vacuum generators are suitably traversed by the at least one assembly vent channel without function, without there being a fluid connection to the vacuum control valves of the vacuum generators. If the vacuum control valves of the vacuum generators have a venting function, there can of course also be a fluid connection between the vacuum control valve and at least one module venting channel within the vacuum generators.

For the control of the electrically actuable vacuum control valve units and the optional control valve units of the optional valve units, it is advantageous if the vacuum generators and—optionally—valve units arranged in a row within the vacuum generator assembly are interspersed in the direction of arrangement by an electrical communication line, which is electrically connected to all control valves and has an interface for connection to an internal or external electronic control unit which provides electrical control signals for controlling the components of the vacuum generator assembly.

The joining region between the base body and the silencer housing is suitably defined by a joining plane perpendicular to the main axis. This joining plane results from a mounting surface arranged on the base body and orthogonal to the main axis and a mounting surface formed on the silencer housing and abutting this mounting surface. Sealing measures are expediently provided in the joining plane in order to seal off fluid channels passing through the joining region from the environment and also from each other.

Measures for fastening the silencer housing to the base body are basically arbitrary, but expediently include at least one screw connection which can also be easily released again if required.

BRIEF DESCRIPTION OF THE DRAWINGS

The invention is explained in more detail below with reference to the accompanying drawing. This shows.

DETAILED DESCRIPTION OF THE INVENTION

Figure 1:
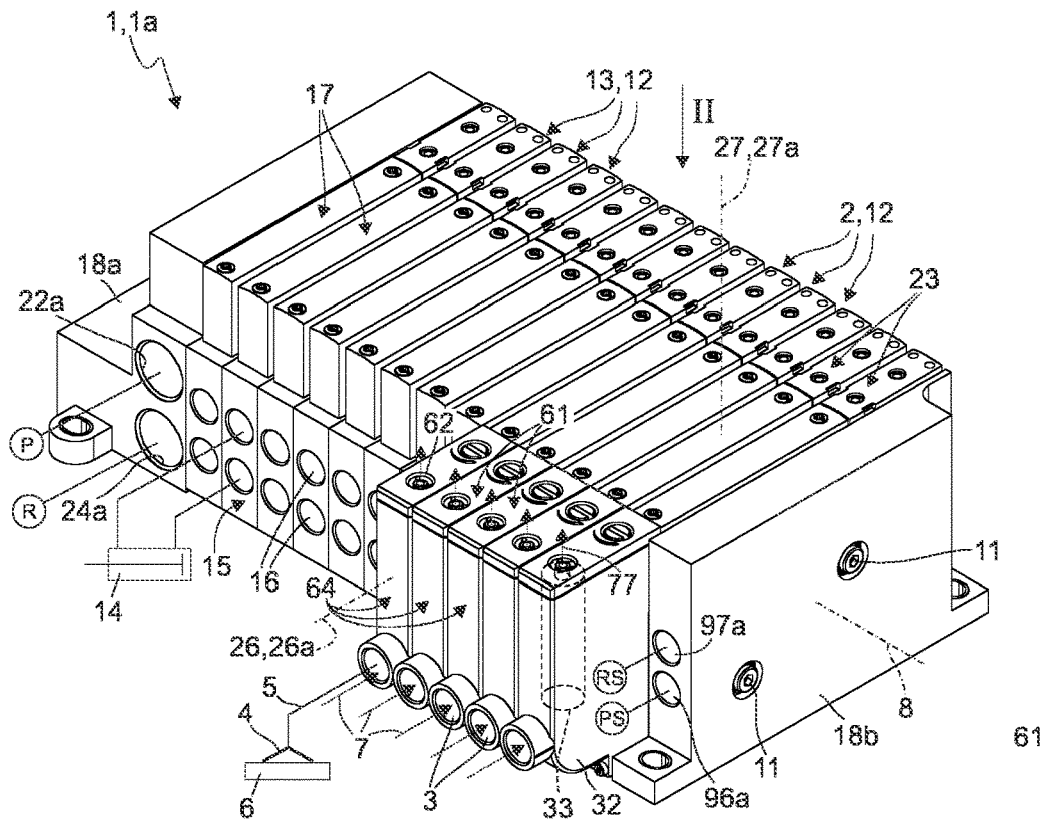
FIG. 1 shows a preferred design of the vacuum unit according to the invention in a perspective view in a practical design as a vacuum generator assembly, whereby a controllable suction gripper and a controllable pneumatic drive are schematically indicated.
Figure 2:
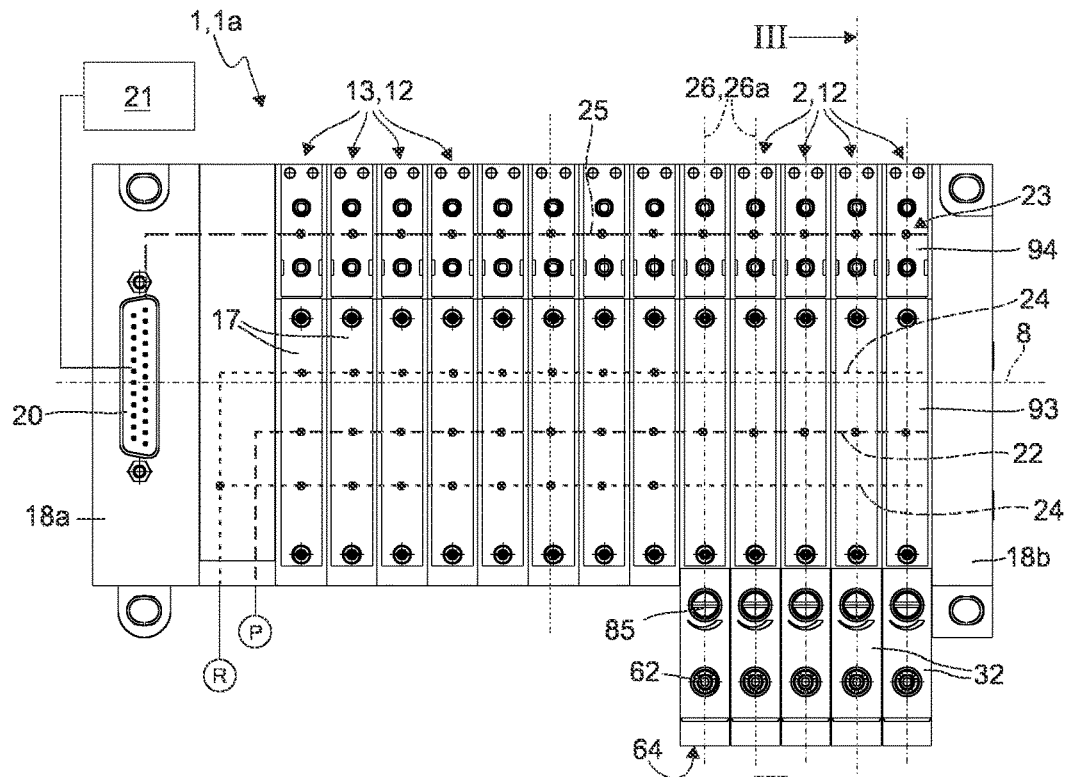
FIG. 2 is a plan view of the vacuum unit shown in FIG. 1, with the direction of view shown by arrow II in FIG. 1, FIG. 3 a section through the vacuum unit of FIGS. 1 and 2 in the area of a vacuum generator according to section line III-III of FIG. 2, whereby the vacuum control valve is shown only symbolically, FIG. 4 a single perspective view of the vacuum generator shown in sectional view in FIG. 3, the silencer housing being illustrated broken open to illustrate a channel run contained therein, and FIG. 5 a top view of the vacuum generator from FIG. 4 in the area of the broken open silencer housing with the direction of view according to arrow V from FIG. 4.
Figure 3:
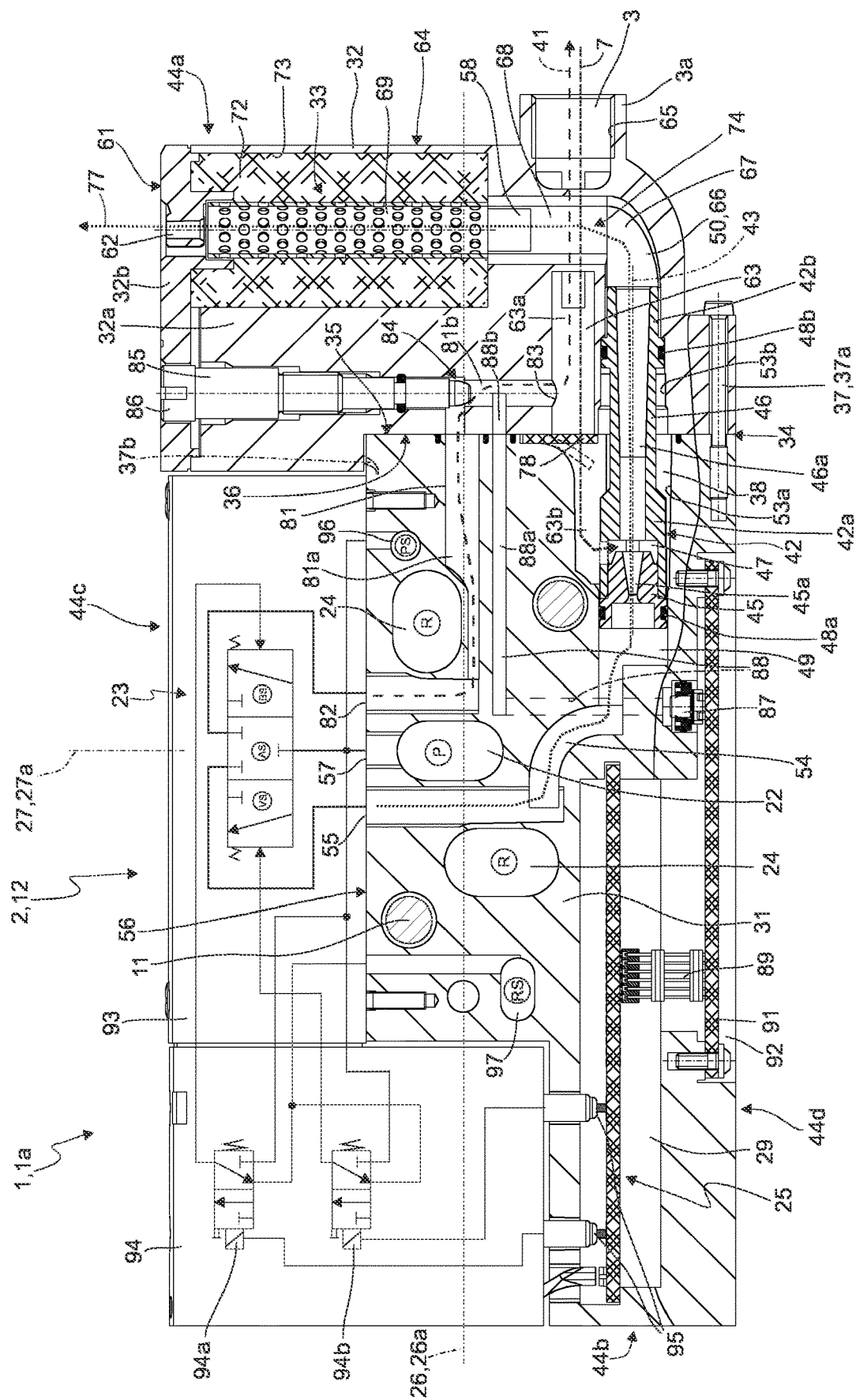
Figure 4:
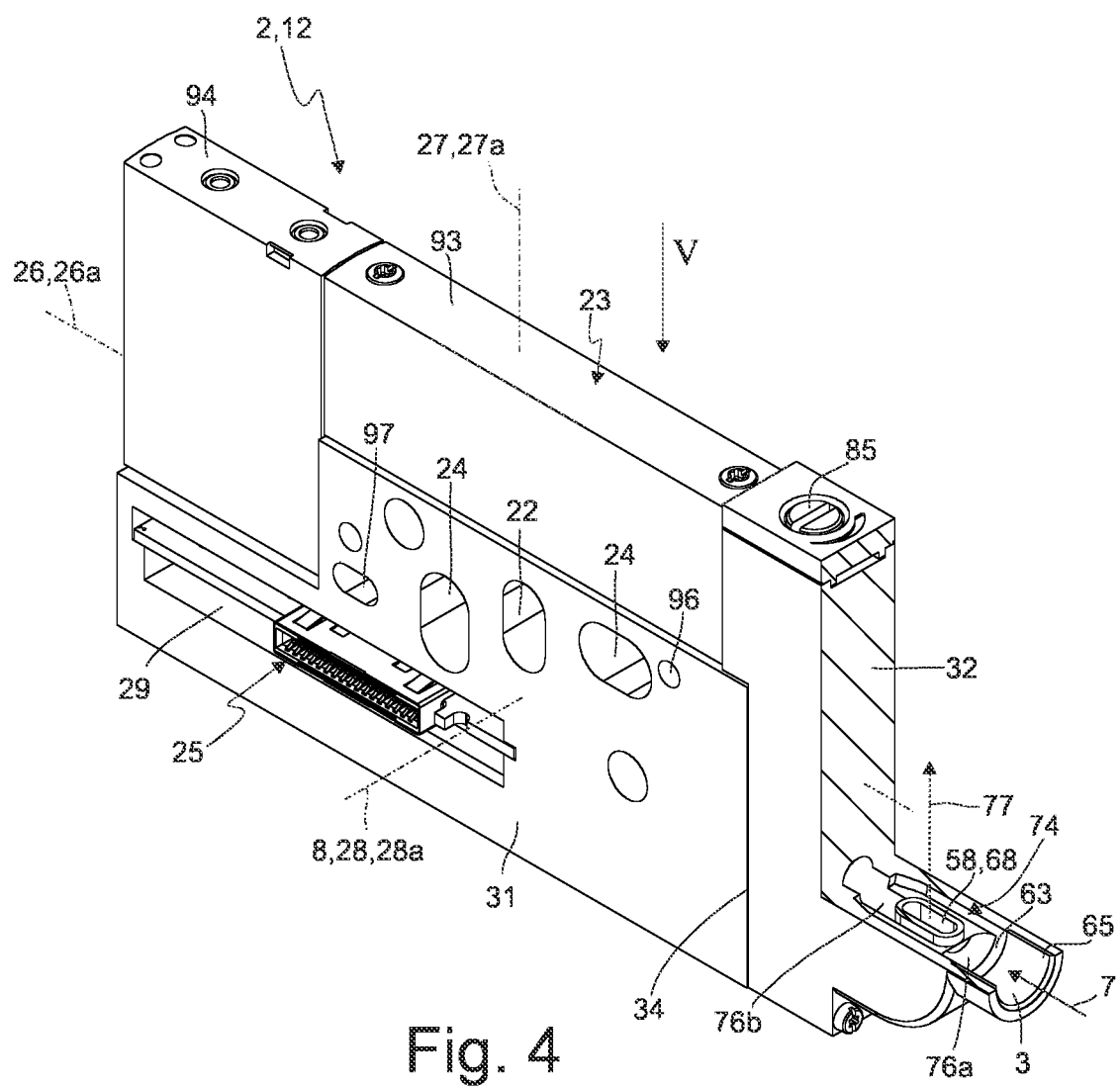
Figure 5:
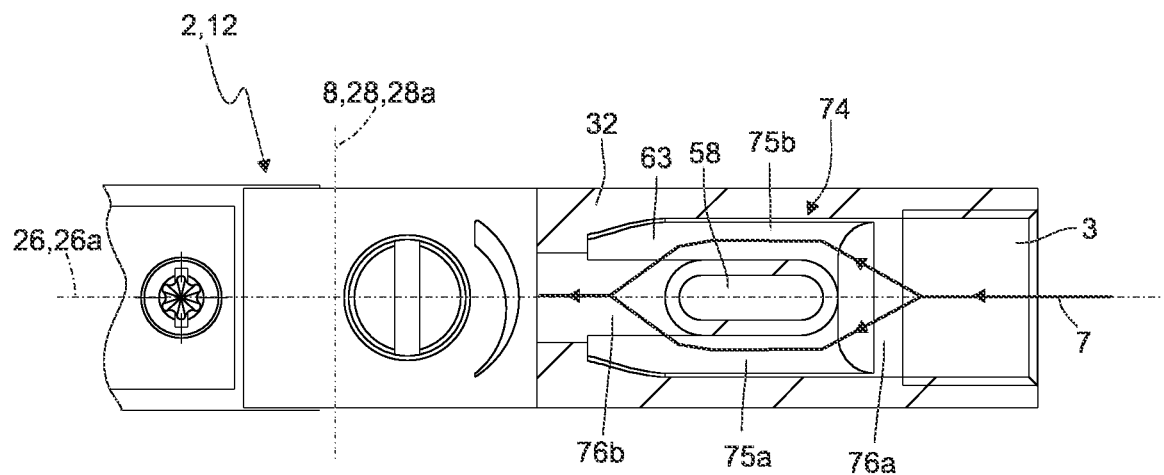

FIGS. 1 and 2 show a vacuum unit 1 which comprises, among other components, a plurality of vacuum generators 2, one of these vacuum generators 2 also being separately illustrated again in FIGS. 3 to 5.

Each vacuum generator 2 is capable of generating, independently of the other vacuum generators 2, a vacuum which can also be referred to as negative pressure and which can be tapped for any purpose at a vacuum tapping opening 3 accessible from the outside.

A preferred use of the vacuum unit 1 provides for the operation of suction grippers 4, one of which is indicated schematically in FIG. 1, wherein such a suction gripper 4 is detachably connected to each vacuum tapping opening 3 via a suction line 5. With the aid of the suction gripper 4, an object 6, for example a workpiece, can be temporarily held for the purpose of its handling and in particular its repositioning under vacuum. The suction gripper 4 contains, for example, one or more suction cups. For gripping and holding an object 6, the suction gripper 4, which is attached to the object 6 with a suction opening, is evacuated, which is caused by the aforementioned vacuum, which produces a suction flow 7 indicated by arrows. For depositing the object 6, the vacuum can be cancelled and the suction gripper 4 can be ventilated with atmospheric pressure or overpressure. The functionality in this regard is also provided by the vacuum generator 2.

In a non-illustrated embodiment, the vacuum unit 1 contains only a single vacuum generator 2. In the illustrated preferred embodiment, the vacuum generator 2 is equipped with a plurality of vacuum generators 2 that are combined into a uniformly manageable assembly by mechanical connection, so that the vacuum unit 1 can be referred to as a vacuum generator assembly 1a. The multiple vacuum generators 2 are operable independently of each other.

Within the vacuum generator assembly 1a, the vacuum generators 2 are arranged side by side in a line-up direction 8 indicated by dashed dots and are mechanically connected to each other. For the mechanical connection, a number of rod-shaped tie rods 11 are provided as an example, which pass through the vacuum generators 2 lined up side by side in the line-up direction 8 and, in particular, clamp them together in a releasable manner. Alternatively, it could be provided that the vacuum generators 2 are fastened to the respective adjacent vacuum generator 2 by fastening screws.

Since they perform a certain function, the vacuum generators 2 can also be generally referred to as functional units 12. In an unillustrated embodiment, the vacuum generator assembly 1a includes only functional units 12 formed as vacuum generators 2. According to the illustrated preferred design, the vacuum generator assembly 1a also contains other types of functional units 12, which are exemplarily valve units 13 suitable for pneumatic control of pneumatic drives 14, such a pneumatic drive 14 being schematically indicated in FIG. 1. The pneumatic drive 14 is, for example, a double-acting pneumatic cylinder.

Each valve unit 13 has one or more working channels 16 opening at a connection surface 15, to which the pneumatic drive 14 to be actuated is connected via at least one compressed air line and the compressed air supply to which can be controlled by an electrically actuable control valve device 17 of the associated valve unit 13 in order to actuate the connected pneumatic drive 14.

The valve units 13 are lined up together with the vacuum generators 2 in the lining-up direction 8, with the tie rods 11 also passing through them, so that all the functional units 12 are clamped together in the lining-up direction 8.

Preferably, the vacuum generators 2 on the one hand and the valve units 13 on the other are combined in the vacuum generator assembly 1a to form functional groups. In principle, however, the order in which the different types of functional units 12 are arranged in a row is arbitrary and, in particular, can be freely selected during assembly of the vacuum generator assembly 1a.

The vacuum generator assembly 1a expediently also has two end modules 18a, 18b, which are attached to the two end faces of the row of functional units 12 opposite each other in the direction of juxtaposition 8 and are expediently also fixed by the tie rods 11 or other fastening means.

For controlling the operation of the functional units 12, an electronic control unit 21 is expediently provided, which is exemplarily an external control unit connected to an electromechanical interface 20 of the vacuum generator assembly 1a, which is arranged, for example, on a first termination module 18a of the two termination modules 18a, 18b. Additionally or alternatively, the vacuum generator assembly 1a may have an integrated electronic control unit.

Each functional unit 12 is configured to control the flow of compressed air required to actuate the suction grippers 4 and, if applicable, the pneumatic actuators 14. This compressed air is supplied to the individual functional units 12, i.e. both to the vacuum generators 2 and to the optional valve units 13, by means of an assembly feed channel 22, which passes through all the functional units 12 in the direction in which they are arranged in a row 8 and, for example, opens out at the first termination module 18a with a connection opening 22a, to which an external compressed air source P is connected during operation of the vacuum unit 1. In the valve units 13, the assembly feed channel 22 communicates with the respective associated control valve device 17, while in each vacuum generator 2 it communicates with an electrically actuable control valve device 23 belonging to the vacuum generator 2, which is also referred to below as vacuum control valve 23 for better differentiation.

Preferably, the functional units 12 arranged in a row are also traversed in the direction of arrangement 8 by at least one common venting channel 24 serving for venting purposes, which is referred to as a module venting channel 24 and which is present twice in the shown embodiment. The at least one assembly vent channel 24 is connected to the atmosphere via an exemplary vent opening 24a arranged on the outside of the first termination module 18 and communicates within each valve unit 13 with its control valve device 17. In this manner, each control valve device 17 is capable of controlling the output and return flow of compressed air through the working channels 16 to actuate a connected pneumatic actuator 14. A silencer, not illustrated, may be attached to the exhaust port 24a. However, a silencer may also be readily integrated into the first termination module 18a.

On the part of the vacuum generators 2, the at least one assembly vent port 24 is functionless in the illustrated embodiment. For this purpose, the vacuum generators 2 are internally designed, in particular, in such a way that there is no fluid connection between the at least one assembly vent channel 24 and the vacuum control valve 23. Nevertheless, it is of course possible to provide such an internal fluid connection also in the vacuum generators 2, if this should be considered functionally useful.

Both the assembly feed channel 22 and the at least one assembly vent channel 24 are composed of channel segments arranged in a row, which are formed as through channels in the individual functional units 12. Seals arranged between adjacent functional units 12, which are not illustrated in more detail, provide a seal in the transition areas.

Conveniently, the vacuum generator assembly 1a also contains an electrical communication line 25 extending in the direction of arrangement 8 through all functional units 12, which on the one hand has the interface 20 already mentioned and on the other hand is electrically connected within each functional unit 12 to the associated control valve device 17 or vacuum control valve 23. In this way, the vacuum control valves 23 and optional control valves 17 receive the electrical control signals required for their operation. The communication line 25 extends in a hollow space, called communication channel 29, which passes through all functional units 12 and is composed of channel segments of the individual functional units 12 arranged in a row.

For example, the communication line 25 is implemented by means of a printed circuit board arrangement which is composed of printed circuit boards of the individual functional units 12 which, when the functional units 12 are attached to one another, are electrically conductively plugged together to form an assembly-like printed circuit board arrangement and are thus interlinked. Alternatively, the printed circuit board arrangement can also consist of a single, continuous and, in particular, one-piece printed circuit board. However, the communication line 25 can also be implemented by means of flexible electrical cables.

In the following, a preferred structure of a vacuum generator 2 is described with reference to FIGS. 3 to 5. The described structure conveniently applies to all vacuum generators 2 of the vacuum generator assembly 1a.

The vacuum generator 2 has a dash-dotted imaginary main axis 26, the axis direction of which is referred to as the main direction 26a. The dimensions in the main direction 26a define an overall length of the vacuum generator 2.

The vacuum generator 2 further has a vertical axis 27 orthogonal to the main axis 26, the axis direction of which is referred to as a height direction 27a, the dimensions in the height direction 27a defining an overall height of the vacuum generator 2.

Finally, the vacuum generator 2 has an imaginary transverse axis 28 orthogonal to both the main axis 26 and the main axis 27, the axis direction of which defines a transverse direction 28a. The dimensions in the transverse direction define a structural width of the vacuum generator 2. In FIG. 3, the transverse axis 28 is perpendicular to the drawing plane.

Preferably, the vacuum generators 2 are plate-shaped, which applies to the illustrated embodiment. The overall length is greater than the overall height, which is greater than the overall width. A main expansion plane of the plate-shaped vacuum generators 2 runs perpendicular to the transverse axis 28. The vacuum generators 2 are lined up with main expansion planes parallel to each other.

The vacuum generator 2 has a base body 31, which can be made of plastic or metal and which is expediently formed in one piece. The vacuum generator 2 further has a silencer housing 32, preferably made of plastic, which accommodates a silencer 33 and which is attached to the base body 31 in a joining region 34 in the main direction 26a.

In the joining region 34, the base body 31 has an attachment surface 35 which is oriented in the main direction 26a and which expediently extends in a plane orthogonal to the main axis 26. The silencer housing 32 has a mounting surface 36 on the outside, with which it is attached to the mounting surface 35 in the joining region 34. Fastening means 37 provide a preferably detachable mechanical connection between the silencer housing 32 and the base body 31. Exemplarily, the fastening means 37 include at least one fastening screw 37a which passes through the silencer housing 32 in the main direction 26a, being supported by a screw head on the silencer housing 32 and being screwed into the main body 31 by a threaded shank.

Exemplarily, the fastening means 37 contain, in addition to the at least one fastening screw 37a, a hook structure 37b spaced in the height direction 27a in this respect for mutually positively hooking the silencer housing 32 and the base body 31.

The vacuum generator 2 has a front end face 44a oriented in the main direction 26a, a rear end face 44b oriented opposite thereto, a top face 44c oriented in the height direction 27a and a bottom face 44d opposite to the top face 44c. In a possible orientation during operation of the vacuum unit 1, the top side 44c points vertically upwards. In principle, however, the vacuum unit 1 can be operated with any spatial orientation of the aforementioned four sides 44a-44d.

A receiving space 38 extending in the main direction 26a is formed in the interior of the vacuum generator 2, which is also referred to hereinafter as the ejector receiving space 38 and in which an ejector unit 42 having a longitudinal extension is received. The ejector unit 42 has a longitudinal ejector axis 43 that is parallel to the main axis 26.

The ejector unit 42 has a jet nozzle 45 axially traversed by a jet nozzle channel 45a, and a capture nozzle 46 axially traversed by a capture nozzle channel 46a axially spaced therefrom. The axial distance between the jet nozzle 45 and the catch nozzle 46 forms a suction zone 47. Sealing rings 48a, 48b surrounding each of the jet nozzle 45 and the capture nozzle 46 seal the ejector unit 42 from the peripheral wall surface of the ejector receiving space 38, so that both an air inlet region 49 upstream of the jet nozzle 45 and an air exhaust region 50 downstream of the capture nozzle 46 are separated from the suction zone 47 in a fluid-tight manner.

The ejector unit 42 extends expediently partly in the base body 31 and partly in the silencer housing 32. It preferably has a first length section 42a arranged in the base body 31 and comprising the jet nozzle 45 and a partial length of the capture nozzle 46, and an adjoining second length section 42b comprising a remaining partial length of the capture nozzle 46, which is accommodated in the silencer housing 32. The ejector unit 42 thereby passes through the joining region 34.

The ejector receiving space 38 is expediently composed of a first receiving recess 53a formed in the base body 31 and a second receiving recess 53b formed in the base body 31. The first receiving recess 53a opens out at the mounting surface 35, and the second receiving recess 53b opens out at the mounting surface 36 in a coaxially aligned arrangement with respect to the first receiving recess 53a. The first length portion 42a extends in the first receiving recess 53a, and the second length portion 42b extends in the second receiving recess 53b. Of the two sealing rings 48a, 48b, one is located at the first length portion 42a and the other is located at the second length portion 42b.

When assembling the vacuum generator 2, the ejector unit 42 can be inserted into the first receiving recess 53a while the silencer housing 32 is still removed, so that it protrudes with the second length section 42b over the mounting surface 35, whereupon the silencer housing 32 is attached in such a way that the second length section 42b engages in the second receiving recess 53b.

Deviating from the illustrated embodiment example, the ejector unit 42 can also be accommodated entirely inside the base body 31. However, only partial accommodation in the base body 31 offers the advantage that sufficient space remains in the base body 31 to accommodate, for example, the described compressed air channels or also the printed circuit board 45.

The jet nozzle channel 45a is constantly fluidically connected to an air injection channel 54 running in the base body 31. Specifically, this is realized in that the air injection channel 54 opens into the air inlet area 49.

The air injection channel 54 passes through the base body 31 and opens out via a first channel mouth 55 to a valve mounting surface 56 formed on the base body 31, on which the vacuum control valve 23 is mounted so that it is connected to the air injection channel 54 via the first channel mouth 55.

The assembly feed channel 22 mentioned further above also opens out with a second channel mouth 57 to the valve mounting surface 56 in such a way that it is fluidically connected to the vacuum control valve 23. In the case of a vacuum unit 1 formed by a single vacuum generator 2, the compressed air source P can also be connected directly to the vacuum control valve 23 outside the base body 31.

By means of the vacuum control valve 23, the pressurization of the air injection channel 54 can be controlled. Thus, the vacuum control valve 23 can be switched to a vacuum position "VS" in which it connects the assembly feed channel 22 to the air injection channel 54 to feed pressurized air into the jet nozzle channel 47a of the jet nozzle 45. Further, the vacuum control valve means 23 may also be purposely switched to a shut-off position "AS" in which the air injection passage 54 is disconnected from the assembly feed passage 22 and consequently from the compressed air source P.

The valve mounting surface 56 is exemplarily formed on an upper side of the base body 31 facing the upper side 44c of the vacuum generator 2. In particular, it extends in a plane orthogonal to the vertical axis 27.

The exhaust opening of the capture nozzle channel 46a facing away from the jet nozzle 45 is adjoined, beginning with the air exhaust region 50, by an air exhaust channel 58 which passes through the silencer housing 32 and the silencer 33 located therein and opens out to the environment or atmosphere at an outer surface of the silencer housing 32, designated as the air exhaust surface 61, with an air exhaust opening 62.

The air exhaust surface 61, including the air exhaust opening 62, is formed with an orientation on the silencer housing 32 perpendicular to the main axis 26. Preferably, and in accordance with the illustrated embodiment, the air exhaust surface 61, as well as the air exhaust opening 62 formed therein, points in the height direction 27a and thereby expediently upwards. The air exhaust surface 61, like the air exhaust opening 62, is arranged in particular on the upper side 44c of the vacuum generator 2. The air exhaust surface 61 expediently is oriented in a plane orthogonal to the vertical axis 27a.

A vacuum channel 63 is formed in the interior of the vacuum generator 2, which extends between the suction zone 47 and the vacuum tapping opening 3. The vacuum tapping opening 3 opens out at an outer surface, referred to as the vacuum tapping surface 64, of the silencer housing 32, which is located at the front end face 44a. Like the vacuum tapping surface 64, the vacuum tapping opening 3 is oriented generally in the main direction 26a.

Exemplarily, the vacuum tapping opening 3 is located in an axially raised tapping nozzle 3a on the vacuum tapping surface 64.

The vacuum tapping opening 3 is provided with a connection device 65 which permits the detachable connection of a suction lead 5 and which, by way of example, consists of an internal thread formed in the tapping nozzle 3a. A hose plug-in coupling can also be provided as a connection device 65, for example.

The above explanations make it clear that there is an angle of 90 degrees between the orientations of the vacuum tapping opening 3 and the air exhaust opening 62. This has, among other things, the effect that suction gripping actions taking place in the vicinity of the vacuum tapping opening 3 are not affected by the exhaust air blown out at the air exhaust opening 62. In particular, even very light objects to be handled cannot be accidentally blown away.

The vacuum channel 63 passes through the silencer housing 32 in the main direction 26a, in particular in a linear extension. Since the suction zone 47 lies at a distance from the joining region 34 in the base body 31, the vacuum channel 63 has an outer channel section 63a passing through the silencer housing 32 and an adjoining inner channel section 63b extending in the base body 31. Both channel sections 63a, 63b open out in alignment with each other to the joining region 34, where they merge into each other.

The ejector unit 42 operates according to the well-known jet nozzle principle. Compressed air fed into the jet nozzle 45 of the ejector unit 42 flows through the ejector unit 42 and causes a vacuum in the suction zone 47, from which the suction flow 7 already described results, so that a vacuum can also be tapped at the vacuum tapping opening 3 and a connected suction gripper 4 is evacuated for gripping an object 6.

The ejector unit 42 and a channel section of the air exhaust channel 58, which is adjacent thereto in the air exhaust area 50 and is designated as the air inlet channel section 66, are oriented to the outer channel section 63a of the vacuum channel 63. In favor of a small overall width of the vacuum generator 2, the outer channel section 63a of the vacuum channel 63 and the air inlet channel section 66 and the ejector unit 42, respectively, are arranged one above the other in the height direction 27a, so that their longitudinal axes expediently lie in the main expansion plane of the plate-shaped vacuum generator 2 explained above. The ejector unit 42 and thus also the air inlet channel section 66 are located in the region of the underside 44d of the vacuum generator 2, with the vacuum channel 63 extending on the side of the ejector unit 42 facing the upper side 44c.

The air exhaust channel 58 has a 90 degree deflected channel course in order to deflect the compressed air exiting the ejector unit 42 in the main direction 26a to the air exhaust opening 62 oriented transversely to the main direction 26a. The deflection takes place in a preferably arcuate deflection section 67 of the air exhaust channel 58, which adjoins the air inlet channel section 66 and which in turn is adjoined by a channel section of the air exhaust channel 58, which in particular has a linear extension and is designated as the air exhaust channel section 68 and which extends at right angles to the main direction 26a and, by way of example, in the vertical direction 27a as far as the air exhaust opening 62.

The air exhaust passage section 68 passes through the silencer 33. A silencer passage 69 is formed in the silencer 33, which forms a length portion of the air exhaust passage portion 68. Preferably, the silencer 33 is designed as a so-called open silencer through which the silencer channel 69 passes completely axially, whereby the exhaust noise of the blown-out compressed air experiences a noise reduction when flowing through the silencer channel 69. The silencer 33 has a silencer body 72 surrounding the silencer channel 69 and having a sound dampening structure, wherein the noise minimization is mainly based on sound reflections taking place in the silencer body 72. Preferably, the silencer channel 72 is peripherally bounded directly by a tube having a perforated wall and therefore also designable as a perforated tube, which is enclosed on its radial outer side by the sound-absorbing structure.

The perpendicular orientation of the air exhaust opening 62 with respect to the main direction 26a makes it possible to provide a silencer 33 with a relatively long silencer channel 69 for the benefit of effective silencing and yet to keep the overall length of the vacuum generator 2 short.

Exemplarily, the silencer 33 is sleeve-shaped and has the silencer channel 69 passing through it centrally in a coaxial arrangement. The axial length of the silencer 33 is greater than the maximum outer diameter of the silencer 33.

The silencer 33 is suitably seated in a receiving chamber 73 formed in the silencer housing 32. Advantageously, the silencer housing 32 is formed in two parts and is composed of a housing main body 32a and a housing cover 32b. In this case, the accommodation chamber 73 is formed in the housing main body 32a and is closed by the housing cover 32b attached to the housing main body 32a. In the illustrated embodiment, this is realized in that the housing cover 32b is associated with the upper surface 44c, having the air exhaust surface 61 and being penetrated by a short channel piece communicating with the silencer channel 69 and defining the air exhaust opening 62, which is thus formed on the housing cover 32b.

Since the vacuum passage 63 is located in the silencer housing 32 between the air inlet passage section 66 and the air exhaust opening 62 of the air exhaust passage 58, a crossing region 74 is located inside the silencer housing 32 where the air exhaust passage 58 and the vacuum passage 63 cross without fluid communication with each other. The deflection section 67 defining a 90-degree deflection of the air exhaust channel 58 is conveniently located in the intersection area 74.

In particular, FIGS. 4 and 5 show a preferred embodiment of the crossing region 74. Accordingly, the vacuum channel 63 is divided within the silencer housing 32 into two channel branches 75*a*, 75*b* which are spaced apart from one another in the transverse direction 28*a* and which pass through the air exhaust channel 58 and, in particular, its air exhaust channel section 68 on sides opposite one another in the transverse direction 28*a*. In relation to the direction of flow of the suction flow 7, the vacuum channel 63 has a first channel branch 76*a* in an area located upstream of the air exhaust channel 58 and a second channel branch 76*b* in an area located downstream of the air exhaust channel 58. There, the two channel branches 75*a*, 75*b* extending forward transversely to the longitudinal direction of the channel at the air exhaust channel section 68 of the air exhaust channel 58 are connected to each other, respectively. The suction flow 7 thus splits in the first channel branch 76*a* into two partial flows each flowing through one of the two channel branches 75*a*, 75*b*, these two partial flows reuniting in the second channel branch 76*b*.

Vacuum generation always takes place as long as a blowing air flow 77, indicated by an arrow, flowing through the ejector unit 42 is generated by the vacuum control valve 23 and exits at the air exhaust opening 62. Preferably, a movable check valve member 78 is arranged in the course of the vacuum channel 63, which closes the vacuum channel 63 in a range lying between the suction zone 47 and the vacuum tapping opening 3 when the blowing air flow 77 is interrupted, so that the vacuum present at the vacuum tapping opening 3 is trapped and no ventilation can take place through the ejector unit 42. This is associated with an air-saving effect, since a blowing air flow 77 is required only temporarily to compensate for leakage in order to maintain a desired vacuum. The check valve member 78 permits air flow in the direction of the suction zone 47 only if the air pressure present at the suction zone 47 is lower than the air pressure at the vacuum tapping opening 3. If the air pressure at the suction zone 47 is higher than at the vacuum tapping opening 3, the check valve member 78 assumes a closed position shutting off the vacuum channel 63.

In an advantageous manner, the embodiment example is equipped with a check valve member 78 that is arranged in the joining region 34 between the base body 31 and the silencer housing 32. There, the check valve member 78 is suitably clamped between the base body 31 and the silencer housing 32 and thus held securely. With the silencer housing 32 removed, convenient assembly is possible.

Preferably, the check valve member 78 is a pivotable check valve that is partially clamped between the base body 31 and the silencer housing 32 and can also be pivoted relative to these two components. In its closed position, it rests against a valve seat formed on the silencer housing 32 and framing the vacuum channel 63, from which it can be lifted in a pivoting movement in order to be pivoted into an open position permitting the suction flow 7, which is indicated with dashed lines in FIG. 3.

The vacuum generator 2 offers the possibility of cancelling the vacuum present at the vacuum pick-up opening 3, in particular at any time, in order, for example, to deposit or drop again an object 6 previously gripped by means of a suction gripper 4. Provided that there is no check valve member 78, this can be done simply by switching the vacuum control valve 23 to the shut-off position "AS" to prevent further feeding of compressed air into the air injection channel 54.

It is advantageous if the vacuum generator 2 offers the possibility of applying an overpressure to the vacuum tapping opening 3 in a pulse-like manner, in order to abruptly reduce the vacuum present with an ejection pulse and to quickly eject a possibly seized object 6. The illustrated embodiment has such equipment for generating an ejection pulse.

The aforementioned ejection pulse equipment includes an air ventilation channel 81 formed in the vacuum generator 2, which is connected to the vacuum control valve 23 on the one hand and is in fluid communication with the vacuum channel 63 on the other hand. The fluid connection with the vacuum channel 63 preferably takes place in the silencer housing 32, so that the air ventilation channel 81 has a first channel section 81*a* extending in the base body 31 and a second channel section 81*b* communicating therewith in the joining region 34 and formed in the silencer housing 32.

The first channel section 81*a* has a channel mouth, designated as the third channel mouth 82 for easier differentiation, at the valve mounting surface 56 which is connected to the vacuum control valve means 23. It further has a channel mouth at the mounting surface 35, which is opposed to a channel mouth of the second channel section 81*b* formed at the mounting surface 36, which further opens into the outer channel section 83*a* of the vacuum channel 63 with a further channel mouth 83.

Exemplarily, the further channel mouth 83 is thus located between the check valve member 78 and the vacuum tapping opening 3.

The vacuum control valve 23 can preferably be switched to a third switching position designated as the venting position "BS", in which the venting channel 81, which is shut off in the other two switching positions, is connected to the assembly supply channel 22 and is acted upon by compressed air. This creates an air ventilation flow 41 in the air ventilation channel 81, which exits at the vacuum tapping opening 3, so that an overpressure is present at the vacuum tapping opening 3 and the vacuum prevailing until then in a connected suction gripper 4 is eliminated.

The "BS" venting position is generally set for only a short time, so that the generated overpressure occurs as an ejector pulse for only a short time. However, longer aeration can also take place, for example in order to use blown-out compressed air to blow a dropped object 6 clean and free it from adhering impurities. The aeration or the maintenance of the aeration position "BS" can in principle be carried out for any length of time.

It is advisable for the ejector pulse equipment to offer the possibility of variably adjusting the intensity of the ejector pulse. For this purpose, an air regulator 84 is inserted in the course of the air ventilation channel 81 to restrict the flow. The air regulator 84 comprises a choke 85 which is adjustably arranged in the silencer housing 32 and is in particular a throttling screw. For its adjustment, the choke 85 is accessible from outside the vacuum generator 2, whereby it has, by way of example, an actuating section 86 arranged in the region of the air exhaust surface 61, which is designed for manual actuation and/or for tool-assisted actuation.

Since the throttle section 84 is located in the silencer housing 32, sufficient space remains in the base body 31 for the formation of the necessary channels.

The choke 85 has a longitudinal extension and is integrated in the silencer housing 32 with an orientation parallel to the longitudinal direction of the silencer 33. The air regulator 84 is located in particular in a region between the silencer 33 and the mounting surface 36.

The vacuum generator 2 is expediently equipped with a pressure sensor 87, by means of which the air pressure prevailing at the vacuum tapping opening 3 can be detected.

The pressure sensor 87 is expediently located in the base body 31 and communicates with a sensor channel 88, which is connected to the vacuum channel 63 and can thus pick up the pressure prevailing therein.

The sensor channel 88 passes through the joining region 34 and has a first channel section 88a formed in the base body 31 and a second channel section 88b adjoining it in the joining region 34 and formed in the silencer housing 32. The second channel section 88b communicates with the vacuum channel 63 by opening into the air ventilation channel 81, which in turn opens into the vacuum channel 63.

The pressure sensor 87 is preferably seated on a sensor board 91 mounted in the base body 31, which is inserted, by way of example, from the underside 44d into a board receptacle 92 formed in the base body 31. Via a contacting device 89, the sensor board 91 is connected to the communication line 25 also arranged in the base body 31, so that signals based on the measured values of the pressure sensor 87 can be transmitted to the electronic control unit 21.

Preferably, the sensor board 91 is equipped with its own evaluation electronics, which can evaluate the measured values of the pressure sensor 87 in order to influence the electrical control of the vacuum control valve 23 depending on the result.

The valve mounting surface 56 equipped with the vacuum control valve 23 expediently has the same spatial orientation as the air exhaust surface 61 on the silencer housing 32. Exemplarily, therefore, it faces the upper surface 44c in the height direction 27a.

The vacuum control valve 23 is expediently of an electropneumatically pilot-controlled design and includes a main valve 93, exemplarily permitting the above-mentioned three switching positions "VS", "AS", "BS", as well as a pilot valve device 94 combined with the main valve 93 to form a structural unit. The pilot valve device 94 is electrically connected to the communication line 25 via a contact device 95 and can be electrically actuated by means of control signals which can be supplied by the electrical control unit 21. The pilot valve device 94 is capable of pneumatically actuating the main valve 93 in order to set one of the three switching positions "VS", "AS", "BS" mentioned above. The compressed air required for this is supplied to the pilot valve unit 94 through the main valve 93 via a pilot supply channel 96 formed in the base body 31. The pilot supply channel 96 expediently passes through all functional units 12 of the vacuum generator assembly 1a and leads to a connection opening 96a formed in the second termination module 18b, to which a control pressure source PS can be connected or is connected.

Conveniently, for a common venting of the pilot valve devices 94 of all vacuum generators 2, there is provided a pilot venting passage 97 passing through the functional units 12, to which the pilot valve devices 94 are respectively connected through the main valve 93 and which leads to a venting port 97a formed in the second termination module 18b and opening to the atmosphere RS.

Exemplarily, each pilot valve device 94 includes two electrically operable pilot valves 94a, 94b combined into one unit, which are conveniently solenoid valves.

The control valve devices 17 of the valve units 13 are expediently also of an electropneumatically pilot-controlled design and each likewise contain a pilot valve device 94 which operates in a comparable manner to the vacuum generators 2 and is connected to the pilot supply channel 96 and the pilot vent channel 97.

The invention claimed is:

1. A vacuum unit comprising at least one vacuum generator, which extends in a main direction along an imaginary main axis and which comprises a base body, which is traversed by an air injection channel, and further comprising a silencer housing containing a silencer, which silencer housing is attached in the main direction to the base body in a joining region, wherein an ejector unit extends in the base body, wherein an ejector longitudinal axis is oriented parallel to the main axis, which ejector unit has a jet nozzle fluidically connected to the air injection channel, a catch nozzle and a suction zone arranged between the jet nozzle and the catch nozzle, wherein the suction zone of the ejector unit communicates via a vacuum channel with a vacuum tapping opening, which vacuum tapping opening enables the tapping of a vacuum and is arranged on an outer vacuum tapping surface of the vacuum generator, and wherein an air exhaust channel adjoins the capture nozzle and passes through the silencer housing and the silencer located therein and has a deflected course through 90 degrees in the silencer housing and opens out to the environment with an air exhaust opening on an air exhaust surface of the silencer housing, wherein the vacuum channel passes through the silencer housing, which is separate with respect to the base body, in the main direction of the vacuum generator, wherein the vacuum tapping surface together with the vacuum tapping opening is oriented in the main direction and is formed on an end face of the silencer housing facing away from the base body in the main direction, and wherein the air exhaust surface together with the air exhaust opening is also formed on the silencer housing with an orientation perpendicular to the main axis.

2. The vacuum unit according to claim 1, wherein the air exhaust port in the silencer housing has an air inlet port portion adjoining the capture nozzle and extending in the main direction of the vacuum generator, an air inlet channel section adjoining the air inlet channel section and defining the 90-degree deflected path, and an air exhaust channel section adjoining the deflection section and leading to the air exhaust opening.

3. The vacuum unit according to claim 2, wherein the vacuum generator has an imaginary vertical axis orthogonal to the main axis and extending in a height direction, wherein the air inlet passage section of the air exhaust passage and the vacuum passage in the silencer housing are arranged one above the other with parallel courses in the height direction.

4. The vacuum unit according to claim 3, wherein the air discharge surface including the air discharge opening is oriented in the height direction of the vacuum generator.

5. The vacuum unit according to claim 1, wherein the air exhaust passage and the vacuum passage cross within the silencer housing in a crossing area.

6. The vacuum unit according to claim 5, wherein the 90 degree deflected course of the air exhaust channel is located in the crossing area.

7. The vacuum unit according to claim 5, wherein the vacuum channel or the air blow-off channel is divided in the crossing area into two channel branches passing the other of the vacuum channel or the air blow-off channel on opposite sides, which channel branches are connected to each other in a channel branch located upstream of the channel passed and in a channel branch located downstream of the other of the vacuum channel or the air blow-off channel.

8. The vacuum unit according to claim 1, wherein the vacuum generator has an imaginary vertical axis orthogonal to the main axis and extending in a height direction and an imaginary transverse axis orthogonal to the main axis and the vertical axis and extending in a transverse direction, wherein the vacuum generator has a plate-like structure in that its dimensions in the transverse direction are smaller than its dimensions in both the main direction and the height direction, expediently, the dimensions in the height direction are also smaller than the dimensions in the main direction.

9. The vacuum unit according to claim 8, wherein the ejector unit extends partly in the base body and partly in the silencer housing, wherein it traverses the joining region and a first longitudinal section of the ejector unit comprising the jet nozzle is accommodated in the base body and a second longitudinal section of the ejector unit adjoining the first longitudinal section and comprising at least a partial length of the catch nozzle is accommodated in the silencer housing.

10. The vacuum unit according to claim 9, wherein a first receiving recess communicating with the air injection channel and opening out to the joining region is formed in the base body and a second receiving recess communicating with the air exhaust channel and likewise opening out to the joining region is formed in the silencer housing, wherein the first receiving recess and the second receiving recess merge into one another in the joining region and wherein the first longitudinal portion of the ejector unit is inserted into the first receiving recess in a sealed manner relative to the base body and the second longitudinal portion of the ejector unit is inserted into the second receiving recess in a sealed manner relative to the silencer housing.

11. The vacuum unit according to claim 1, wherein a movable check valve member is arranged in the course of the vacuum channel in the joining region between the base body and the silencer housing, which check valve member permits an air flow in the direction of the suction zone and blocks it in the opposite direction.

12. The vacuum unit according to claim 1, wherein the vacuum channel in the silencer housing communicates with an air ventilation channel, through which the vacuum channel can be subjected to overpressure for reducing a vacuum prevailing therein and which has a first channel section extending in the base body and a second channel section extending in the silencer housing, the second channel section merging at one end into the first channel section in the joining region and opening at the other end into the vacuum channel.

13. The vacuum unit according to claim 12, wherein an air regulator is inserted in the course of the second channel section of the air ventilation channel in the silencer housing, which air regulator has a choke arranged adjustably for variable setting of a throttle intensity in the silencer housing.

14. The vacuum unit according to claim 1, wherein the vacuum channel in the silencer housing communicates with a sensor channel which extends through the joining region also in the base body of the vacuum generator and leads to a pressure sensor accommodated in the base body.

15. The vacuum unit according to claim 1, wherein the silencer housing has a housing main body in which a receiving chamber is formed which receives the silencer and is closed by a housing cover of the silencer housing in which the air exhaust opening is formed.

16. The vacuum unit according to claim 1, wherein the silencer is formed in the shape of a sleeve and is penetrated coaxially in a longitudinal direction by a silencer channel forming a longitudinal portion of the air exhaust channel, the silencer channel having a greater length than its outer diameter and being arranged in the silencer housing with its longitudinal direction oriented orthogonally to the main axis of the vacuum generator.

17. The vacuum unit according to claim 16, comprising a plurality of vacuum generators arranged in series in an alignment direction orthogonal to the main direction and mechanically connected to each other, the base bodies of which are traversed in the direction of juxtaposition by an assembly feed channel which is provided for connection to an external compressed air source and is connected in each vacuum generator to the vacuum control valve thereof in order to provide the compressed air required for controlling the application of compressed air.

18. The vacuum unit according to claim 17, wherein the vacuum generator assembly has, in addition to the vacuum generators, at least one valve unit suitable for pneumatic control of a pneumatic drive, which valve unit is lined up together with the vacuum generators in the direction in which they are lined up and through which the assembly feed channel also passes, wherein the assembly feed channel is connected within the at least one valve unit to an electrically actuable control valve, by means of which the pressurization of at least one working channel of the valve unit is controlled.

19. The vacuum unit according to claim 18, wherein the vacuum generators and the at least on valve unit are arranged in a row and are penetrated in the direction in which they are arranged by at least one assembly vent channel communicating with the atmosphere, which vent channel is fluidically connected to the control valve of each valve unit.

20. The vacuum unit according to claim 18, wherein the vacuum generators and the at least one valve unit are arranged in series and are interspersed in the direction of series by an electrical communication line which is electrically connected to all vacuum control valves and to a control valve of the at least one valve unit and has an interface for electrical connection to an electronic control unit.

21. The vacuum unit according to claim 1, wherein the base body of the vacuum generator is equipped with an electrically actuable vacuum control valve which is connected to the air injection channel to control a pressurization of the air injection channel with compressed air.

22. The vacuum unit according to claim 21 in connection with claim 12, wherein the vacuum control valve is also connected to the air ventilation channel to control a pressurization of the air ventilation channel and the vacuum channel communicating therewith.

\* \* \* \* \*